United States Patent
Naitoh et al.

(10) Patent No.: US 6,877,074 B2
(45) Date of Patent: Apr. 5, 2005

(54) APPARATUS HAVING DURABLE STORAGE

(75) Inventors: Arimasa Naitoh, Fujisawa (JP); Shinji Matsushima, Yokohama (JP); Sohichi Yokota, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/021,983

(22) Filed: Dec. 13, 2001

(65) Prior Publication Data

US 2002/0083280 A1 Jun. 27, 2002

(30) Foreign Application Priority Data

Dec. 27, 2000 (JP) .................................... 2000-397044

(51) Int. Cl.[7] ............................................. G06F 12/00
(52) U.S. Cl. ...................... 711/154; 711/100; 711/102; 711/111; 711/4; 713/300; 713/310; 713/323; 713/324
(58) Field of Search ............................... 711/154, 100, 711/102, 111, 4; 713/300, 310, 323, 324

(56) References Cited

U.S. PATENT DOCUMENTS

| | | | | |
|---|---|---|---|---|
| 5,283,906 A | * | 2/1994 | Chen | 713/323 |
| 5,675,810 A | * | 10/1997 | Sellers | 713/323 |
| 5,900,875 A | * | 5/1999 | Haitani et al. | 345/840 |
| 5,905,914 A | * | 5/1999 | Sakai et al. | 710/67 |
| 5,954,820 A | * | 9/1999 | Hetzler | 713/323 |
| 6,300,946 B1 | * | 10/2001 | Lincke et al. | 345/700 |
| 6,448,988 B1 | * | 9/2002 | Haitani et al. | 345/840 |
| 6,694,440 B1 | * | 2/2004 | Ishibashi | 713/310 |
| 2003/0097398 A1 | * | 5/2003 | Knox et al. | 709/203 |

OTHER PUBLICATIONS

Ramtron, Specification Sheet, FM1608S FRAM Memory, pp 1–7, 1995.*
Ramtron, Application Note, "Replacing a Dallas Semiconductor DS1225 with FRAM Memory," pp 1–2, 1994.*

* cited by examiner

Primary Examiner—Stephen Elmore
(74) Attorney, Agent, or Firm—Carlos Nunoz-Bustamante

(57) ABSTRACT

A data server system and a computer apparatus is provided that can process external accesses reliably during mobile use. A main PC set in the suspend or hibernation mode during mobile use is configured so as to read/write data only from/to an MRAM having no mechanically movable parts and capable of withstanding higher levels of vibration than a hard disk drive (HDD) in response to a predetermined operation from a hand-held terminal. A power supply controller keeps power supplied to the MRAM and stops the supply of power to the HDD having mechanically movable parts. Whether or not the main PC is moving is decided automatically by detecting if the main PC is connected to an AC power source, a LAN cable, and a telephone cable.

14 Claims, 14 Drawing Sheets

[Figure 1]
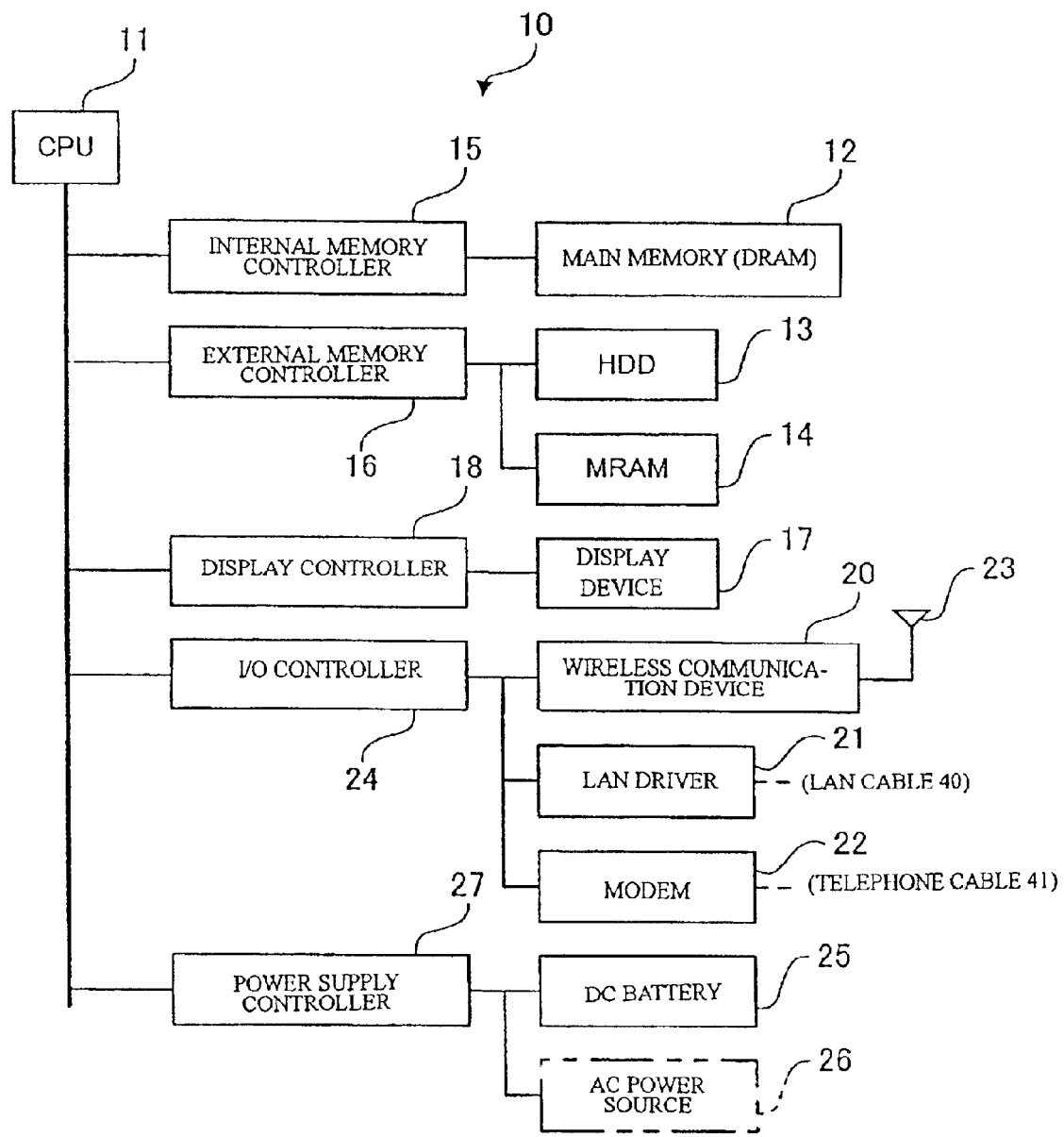

[Figure 2]
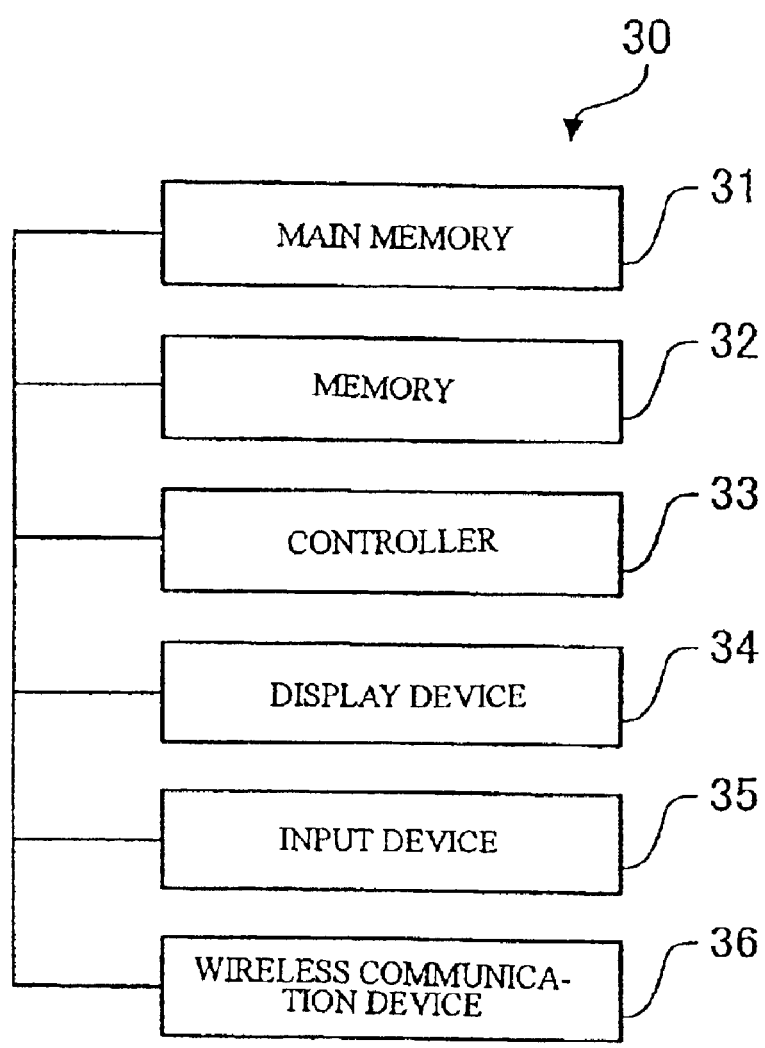

[Figure 3]
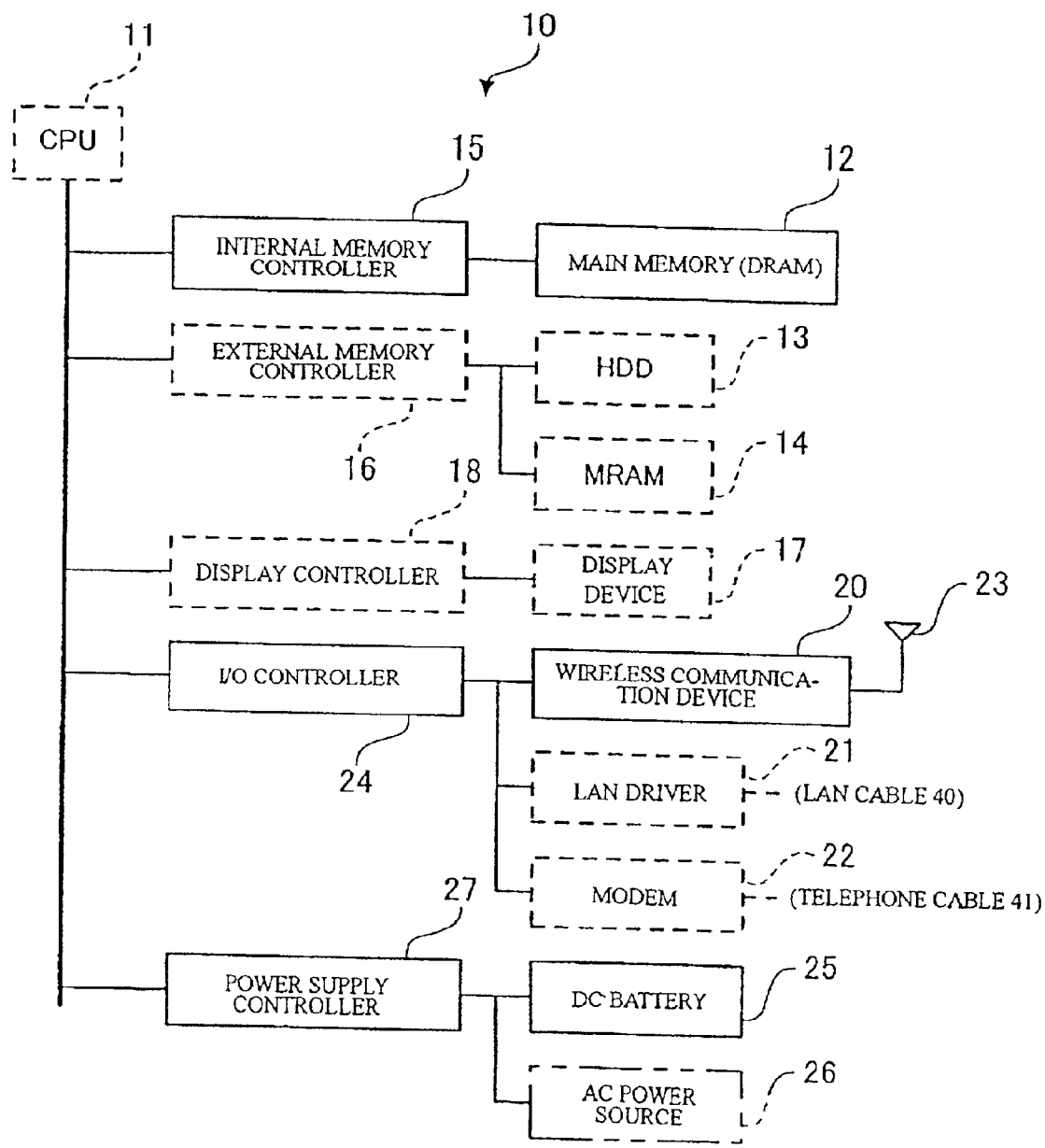

[Figure 4]
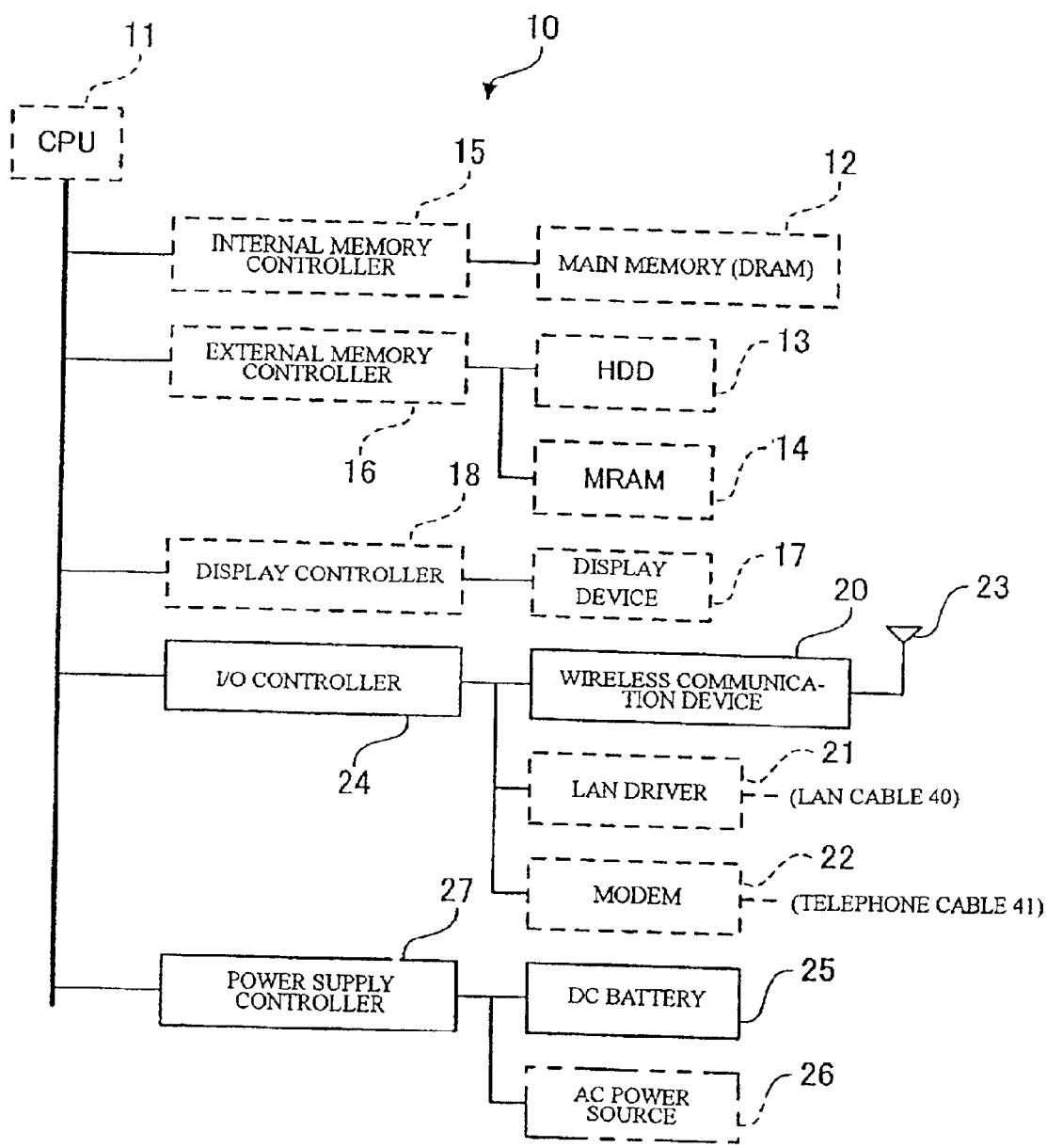

[Figure 5]
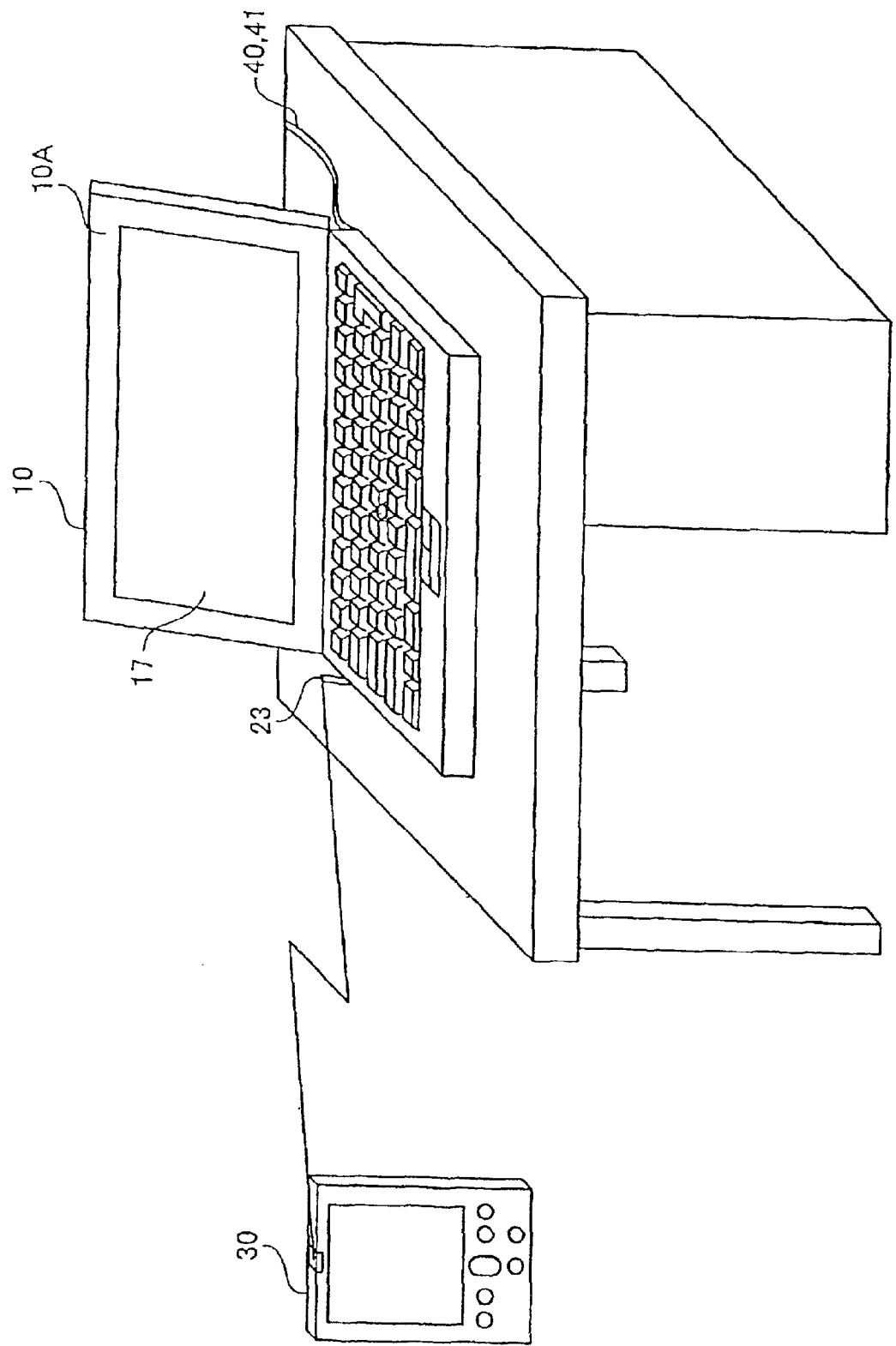

[Figure 6]
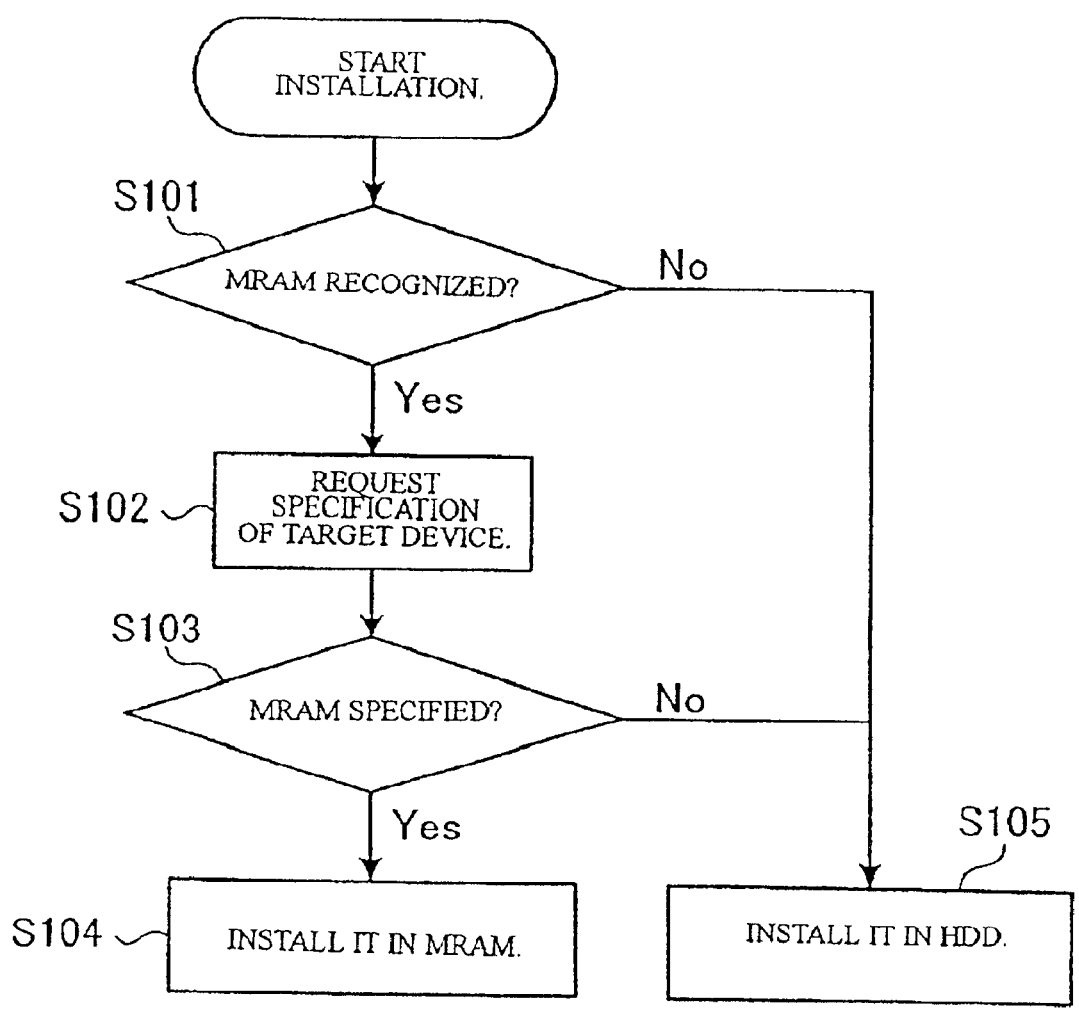

[Figure 7]
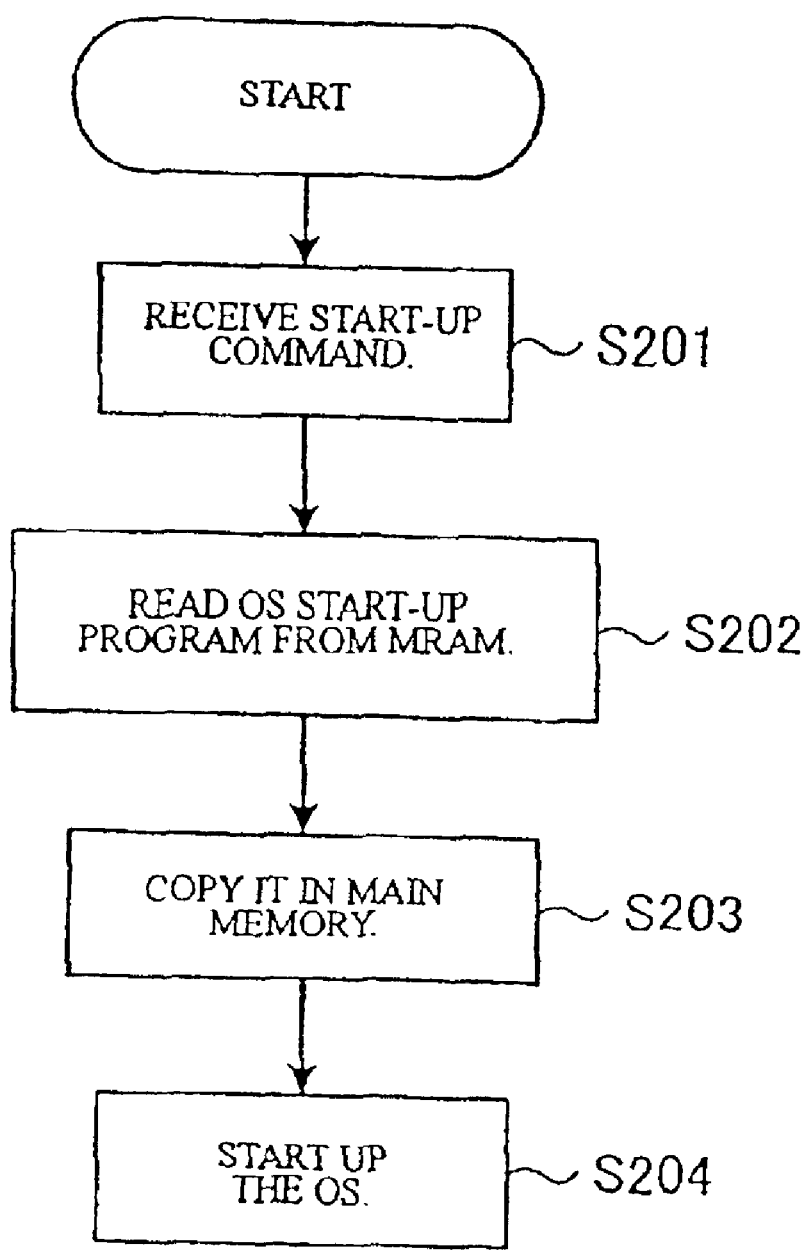

[Figure 8]
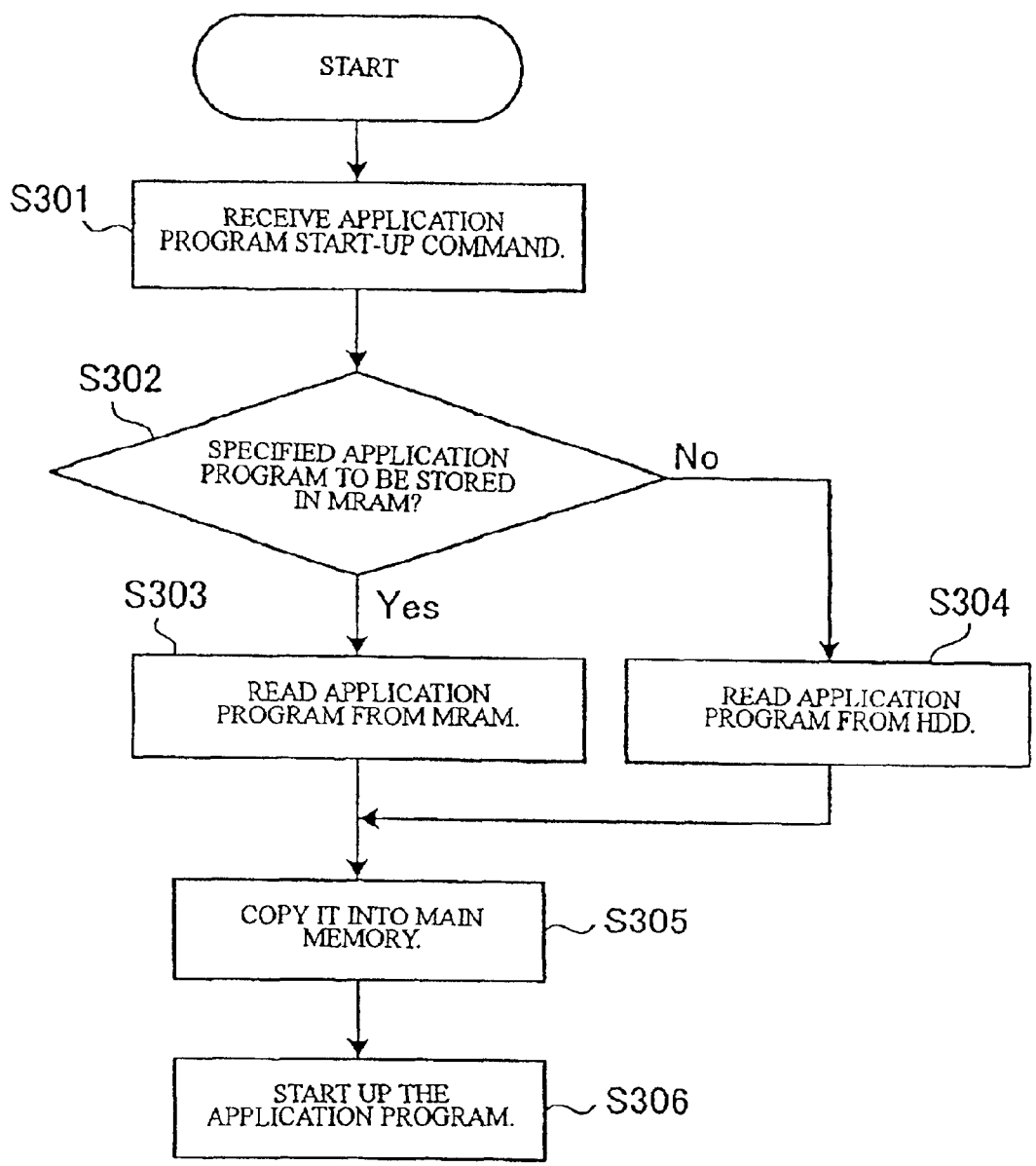

[Figure 9]
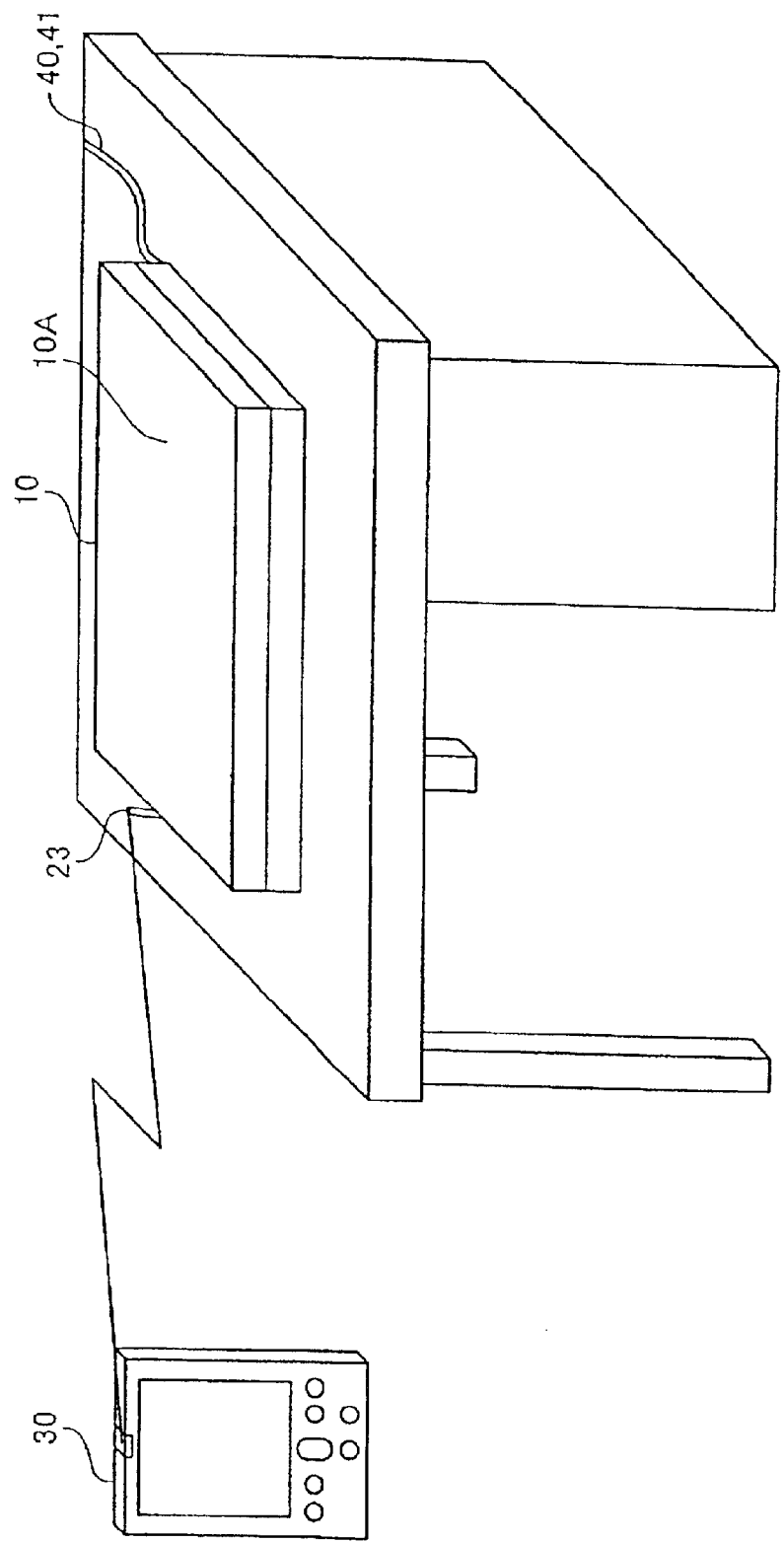

[Figure 10]
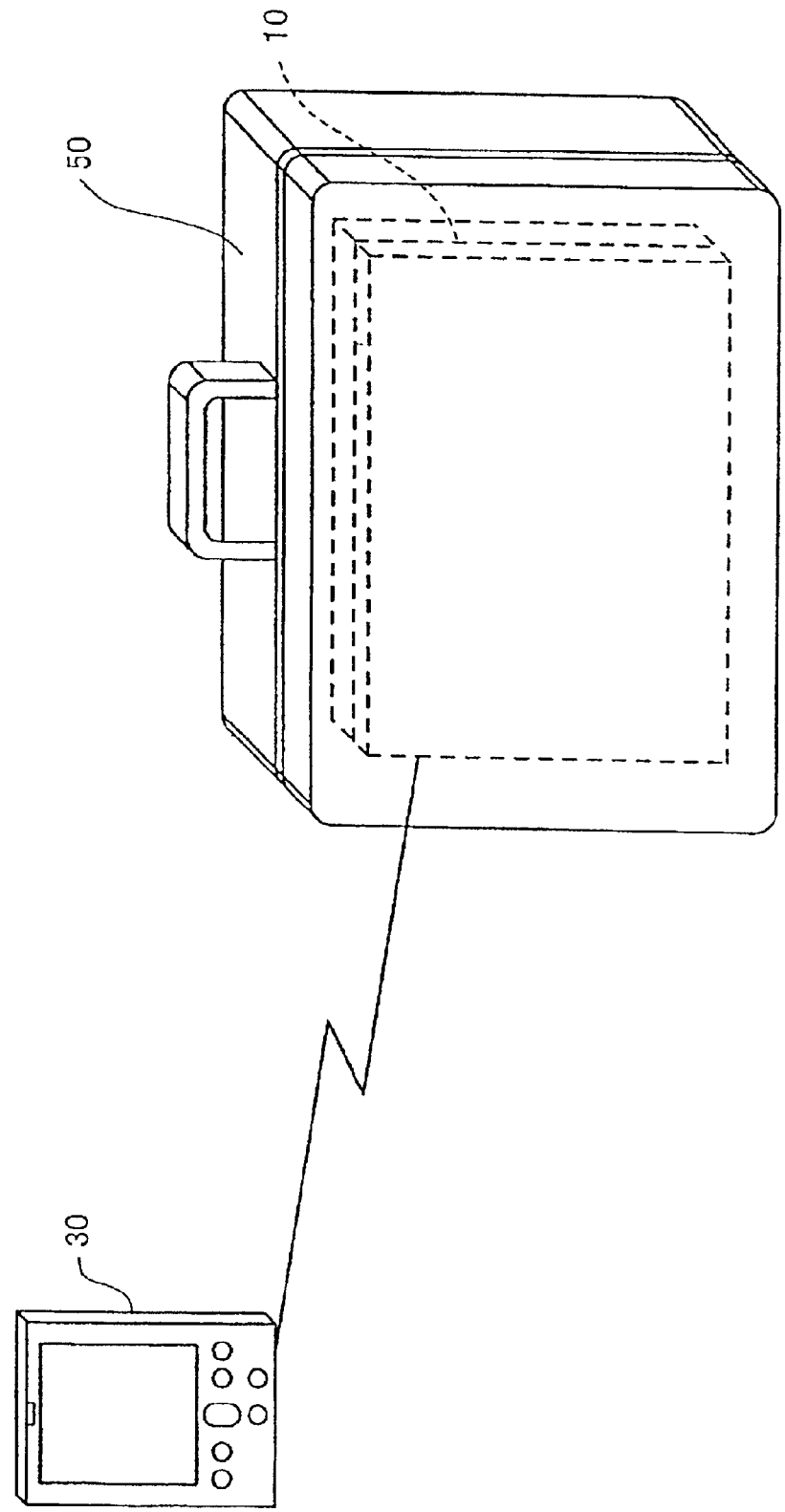

[Figure 11]
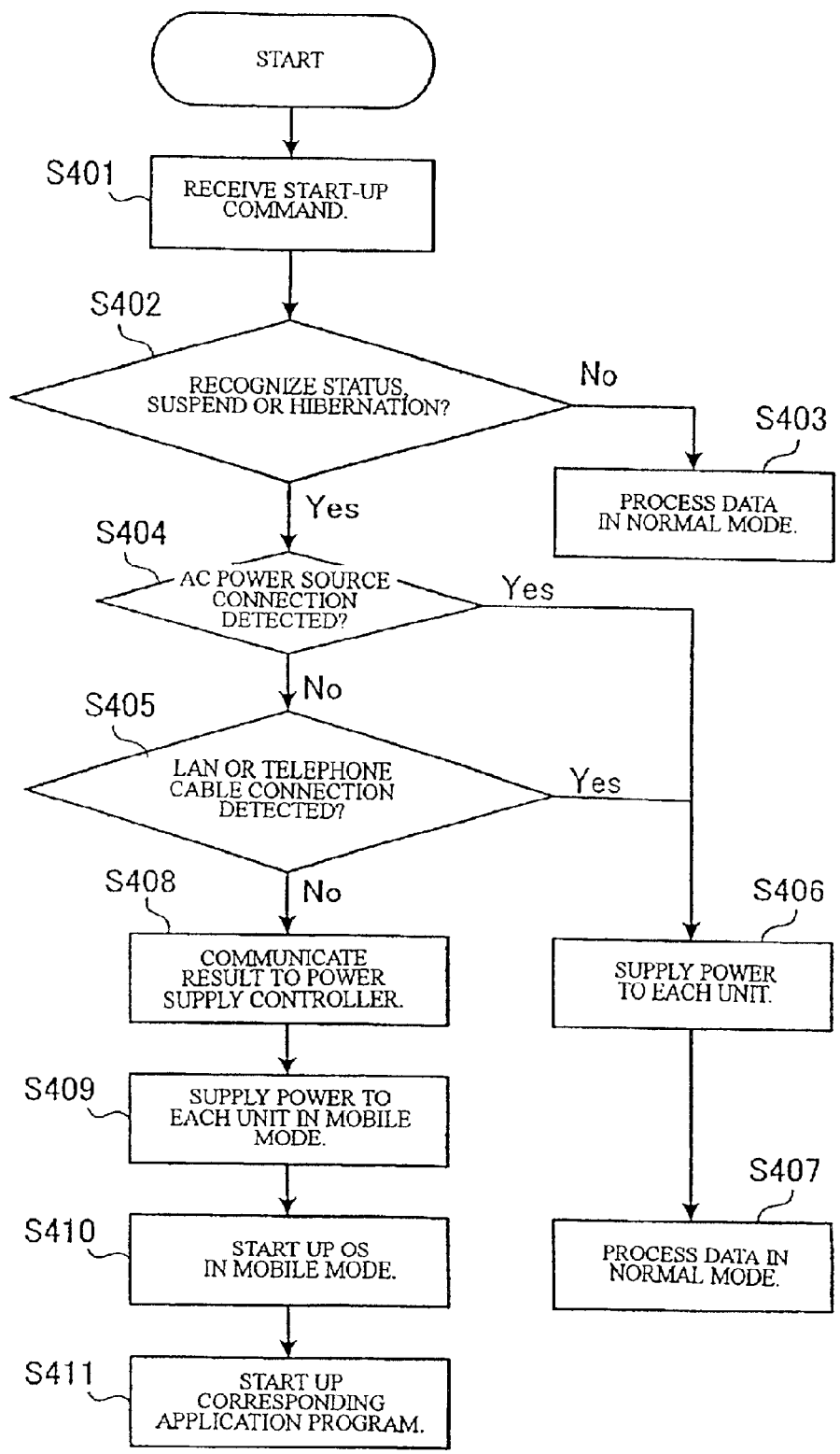

[Figure 12]
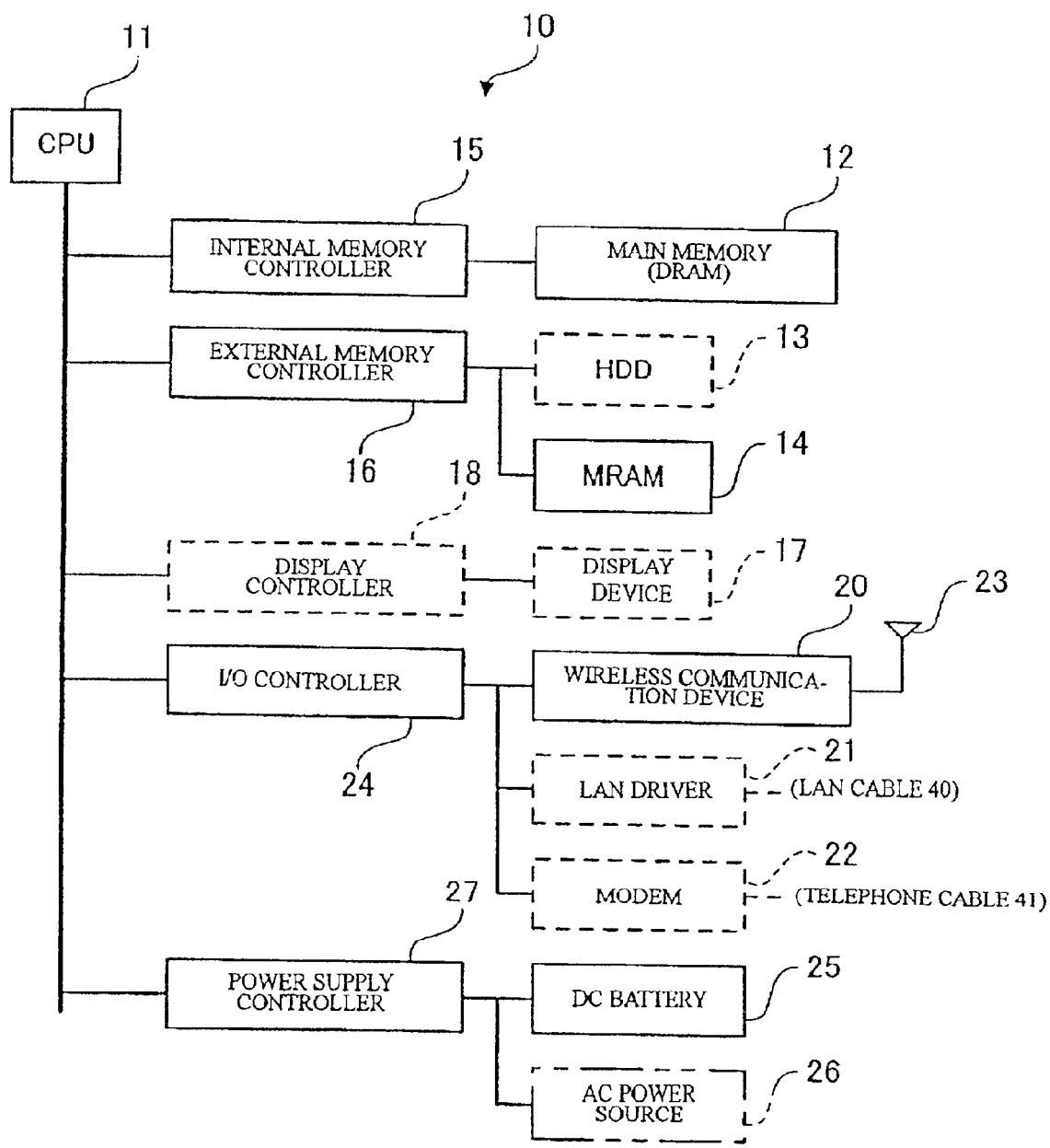

[Figure 13]
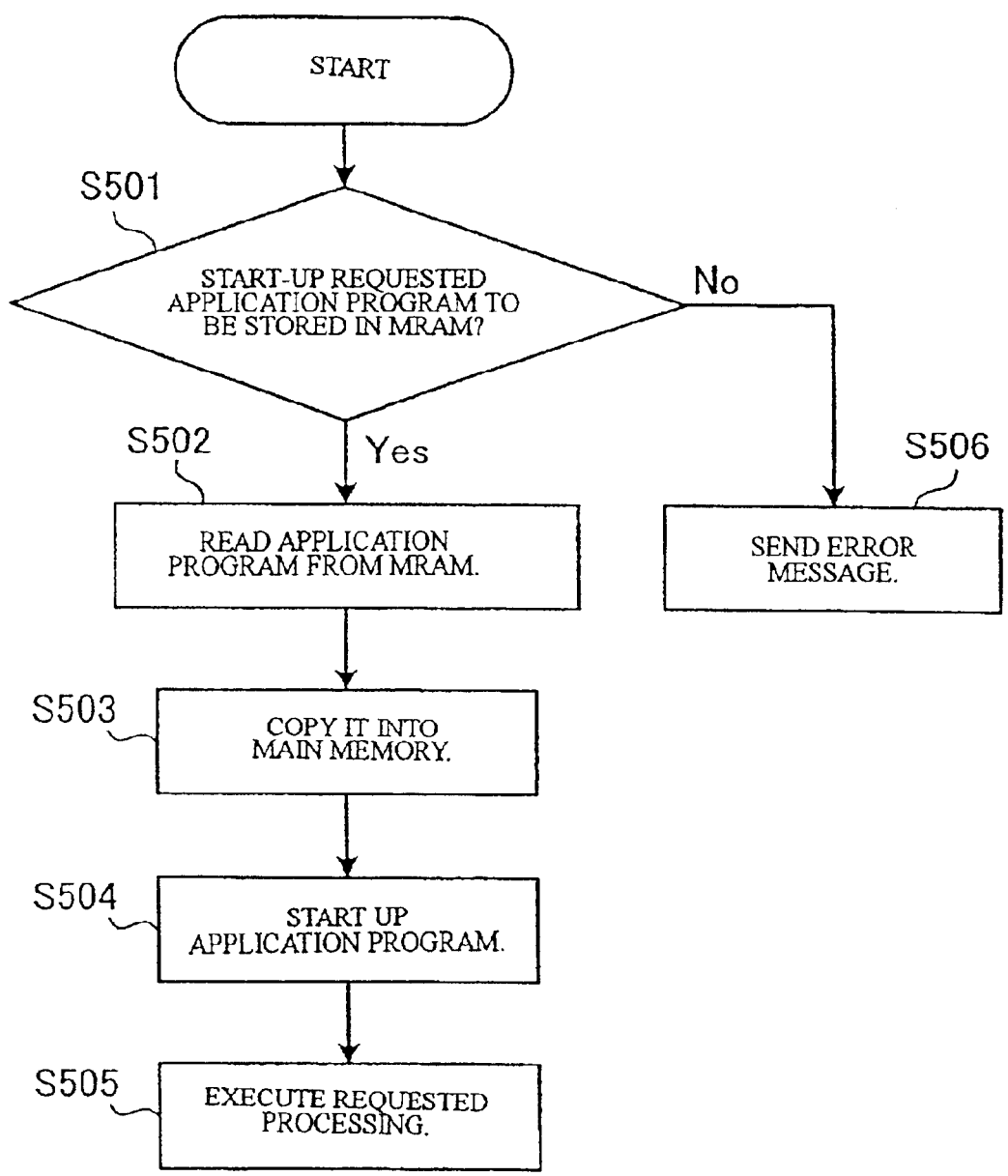

[Figure 14]
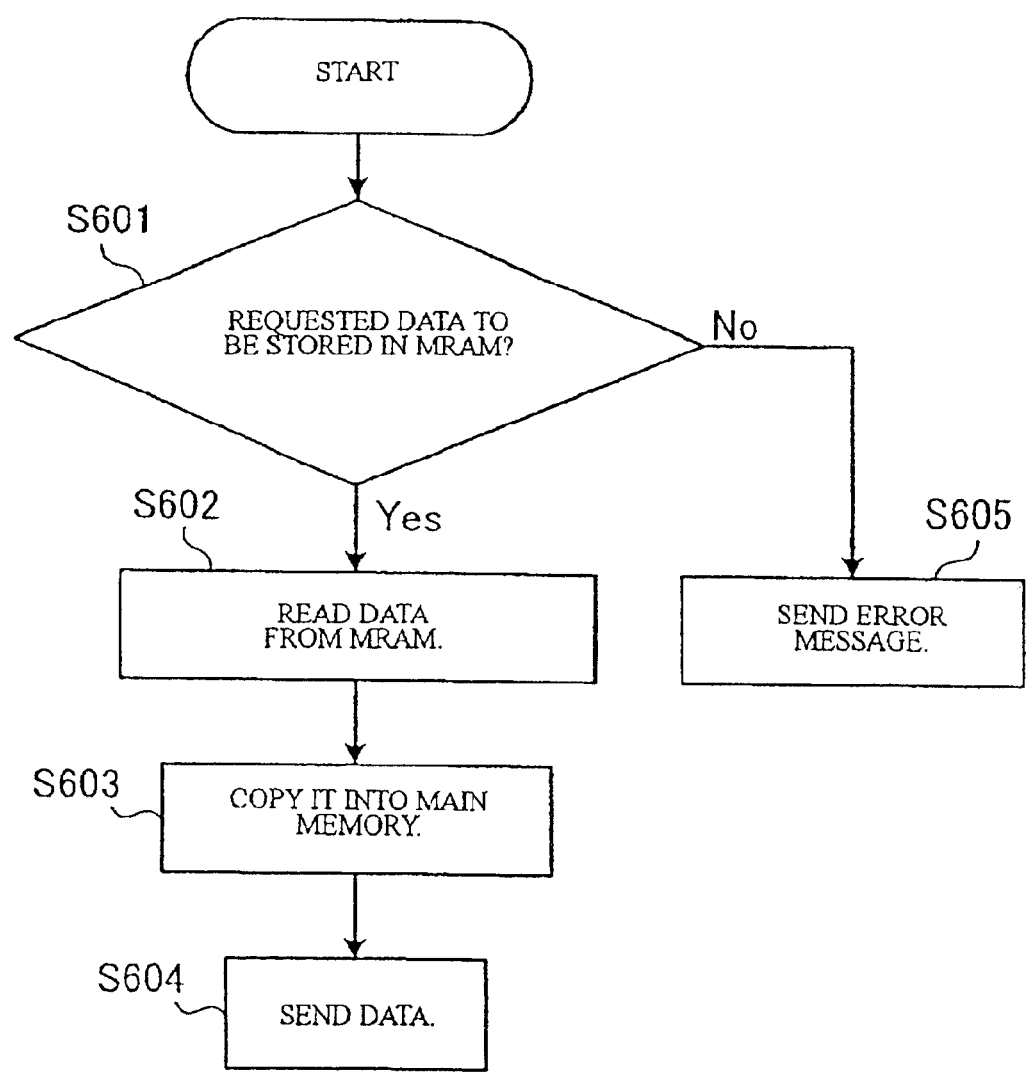

APPARATUS HAVING DURABLE STORAGE

BACKGROUND OF THE INVENTION

This invention pertains to a data server system and a computer apparatus preferred for exchanging data between, for example, a hand-held computer terminal and a personal computer.

In recent years, hand-held computer terminals (hereinafter, to be abbreviated as "hand-held terminals") are coming into wide use. These hand-held terminals are represented, for example, by WorkPad (a registered trade mark of IBM Corporation) and Palm Computing (a registered trade mark of 3COM Corporation, USA), etc. A hand-held terminal can be used for schedule and address management, as well as sending/receiving e-mails and browsing homes pages on the Internet via a portable telephone, etc.

Data used by such a hand-held terminal is often held in a users desk-top or lap-top personal computer as well. The user, therefore, is requested to synchronize the data between the hand-held terminal and the personal computer through communications via a cable or via an infrared beam and/or radio waves at proper intervals.

On the other hand, the hand-held terminal is confronted with a problem; it does not have the newest data. For example, when the user uses the hand-held terminal away from home (office) so as to browse data, the data is often the data synchronized before leaving home with the data in the main personal computer; the data is not the data browsed at that time. More concretely, when the user tries to browse an e-mail on the hand-held terminal after it is received by the main personal computer and transferred to the hand-held terminal, the user cannot browse the e-mail on the hand-held terminal in the case where the e-mail is received by the main personal computer later than that data synchronization. In the case where data is updated in the main personal computer after that data synchronization between the hand-held terminal and the main personal computer, the updated data cannot be accessed at the hand-held terminal unless the data synchronization is made again.

In order to solve such a problem while a lap-top personal computer is used as the main personal computer, the lap-top personal computer must be kept active, thereby data synchronization is done as needed at a proper timing between the hand-held terminal and the lap-top PC respectively.

During such data synchronization while the user is moving, a movable part in the lap-top PC, especially the hard disk drive (hereinafter, to be abbreviated as the HDD) that stores data, might be affected adversely. In the HDD, data is read/written from/to a predetermined track by the head provided at the tip of the locking arm. The arm moves in the radial direction of the magnetic disk so as to access the data while the disk rotates. Consequently, when various vibrations are experienced by HDD while the hand-held terminal is mobile, the positional accuracy of the arm for moving the head on the magnetic disk is degraded, resulting in data read/write errors, data crash, and breakdown of the HDD itself.

Under such circumstances, it is a purpose of the present invention to provide a data server system, a computer apparatus, etc. that can process data in response to an external access even during mobile use of the terminal.

SUMMARY OF THE INVENTION

In order to achieve the above purpose, the server system of the present invention, when receiving a data read/write request from a second computer apparatus, reads/writes data from/to a second data storage device of a first computer apparatus that includes a first data storage device and a second data storage device. The second data storage device being more durable than the first data storage against vibrations. The first computer apparatus can switch among a plurality of operation modes, such as a normal mode in which the computer apparatus is installed fixedly on a desk or the like, a mobile mode in which the user uses the computer apparatus away from home (office), and so on.

Consequently, the first computer apparatus is just required to operate the second more durable data storage device while in the mobile mode. In this case, the first computer apparatus is enabled to access the second data storage device in a predetermined mode (mobile mode) and access the first data storage device and/or the second data storage device in another mode (normal mode).

And, the second data storage device stores, for example, the kernel of an operating system for controlling the first computer, data including application programs used in a predetermined mode, etc. Consequently, the user can start up the first computer apparatus while mobile without accessing the first data storage device.

Furthermore, the server system of the present invention can output a message for rejecting an access when receiving a request for accessing the first data storage device from the second computer apparatus in a predetermined mode, for example, while mobile.

It is also possible to use a lap-top PC as the first computer apparatus and a hand-held terminal as the second computer apparatus.

The first and second data storage devices in the first computer apparatus may be used as external storage devices (auxiliary storage devices) for storing external data separately from an internal storage device (main storage device) used to send/receive internal data directly to/from the CPU. The first data storage device may be a HDD and the second storage device having higher anti-vibration properties may be a non-volatile solid-state memory (semiconductor memory, etc.).

"The first data storage device" and "the second data storage device" just mean a relationship between those two data storage devices. This relationship can apply to a case in which the first computer apparatus is provided with three or more external data storage devices. Concretely, in the case where only two given data storage devices are picked up even when there are three data storage devices, one of the two data storage devices is higher than the other in anti-vibration properties, it becomes the second data storage device and the other becomes the first data storage device.

The computer apparatus of the present invention maybe configured so as to have a power supply controller and switch between first and second modes. The first mode is used to supply an electric power to the first and second data storage devices and the second mode is used to supply an electric power to the second data storage device while suppressing power to the first data storage device. In this case, the first mode enables the user to use the computer apparatus installed fixedly, for example, on a desk and the second mode enables the user to use the computer apparatus while the user is on the road with the apparatus. Consequently, when the computer is used as a single unit away from home (office), for example, in a train, aircraft, or the like, the power consumption of the computer apparatus can also be constrained.

Furthermore, the power supply controller may be switched to the third mode in which no electric power is supplied to any of the first and second data storage devices. In this case, the computer apparatus may be switched to the second mode only when a condition decided in the third mode is satisfied. The third mode mentioned here is a mode for shutting down the power supply to the first and second data storage devices while the user carries the computer apparatus. The suspend mode and the hibernation mode are also equivalent to this third mode respectively.

In addition, the second mode may be selected when a condition is satisfied which indicates that the computer apparatus is moving. The condition that the computer apparatus is regarded to be moving is, for example, whether or not an AC power line, a LAN cable, and a telephone line are connected to the computer apparatus respectively. An acceleration or force that affects the computer apparatus may be detected by an acceleration sensor or the like as such a condition. The computer apparatus may further be provided with a movement detector for detecting those conditions.

The computer apparatus can also be provided with a communication device for external data communications. In such a case, the first mode is set in response to an external data access request when the computer apparatus is used fixedly on a desk top, etc. and the second mode is set in response to an external data access request when the user carries the computer apparatus away from home (office).

Such a computer apparatus can use a movable memory having a mechanically movable part as the first data storage device and a solid-state memory having no movable part as the second storage device.

The solid-state memory should preferably be able to store at least a kernel, which is the core of an operating system (OS) of the computer apparatus, and an application program that can process requests from an external device. Consequently, it is possible to process requests from external devices with use of only the data (program) stored in the solid-state memory.

And, in the case where, for example, a magnetic random memory is used as the solid-state memory, the operating system (OS) can be started up without doing any mechanical operation, which is required when the kernel of the operating system (OS) is stored in a movable memory having a mechanically movable part.

The computer apparatus of the present invention is provided with a first data storage device and a second data storage device used as external or permanent storage devices for storing external/permanent data. The second storage device requires a time shorter than the first data storage device for executing a process between start-up and reading of data. When the computer apparatus is to be started up, the start-up program is read from the second data storage device so as to start up the operating system (OS). The second data storage device, which is faster than the first data storage device for executing a process between start-up and reading of data, can start up the operating system (OS) more quickly than when the OS start-up program is read from the first data storage device.

Furthermore, this computer apparatus, when being accessed from an external device in the suspend mode, reads/writes external data from/to the second data storage device. When being accessed from an external device in the hibernation mode, the computer apparatus reads the start-up program from the second data storage device so as to start up the operating system (OS), then reads/writes external data from/to the second data storage device.

The computer apparatus of the present invention is provided with a second storage device more durable than a first storage device against vibrations. And, the request receiver for receiving external requests, which is kept supplied with an electric power while the computer apparatus is powered, can always accept external requests in that state. In the case where the request receiver receives an external data read/write request while the computer is, for example, in the suspend or hibernation mode and the power supply to the first and second data storage devices is shut off, the second storage means is powered and enabled to read/write data from/to itself. In addition, in the case where the operating system is not started up yet at that time, the computer apparatus can read the start-up program from the second storage device so as to start up the operating system (OS).

Furthermore, the computer apparatus of the present invention can be configured so as to detect whether or not a plurality of data storage devices exist when a program is to be installed therein. When a plurality of data storage devices exist, the computer apparatus can display a panel on which the user is requested to specify a data storage device to which the program is to be stored, then stores the program in the data storage device specified on the panel.

BRIEF DESCRIPTION OF THE DRAWINGS

Some of the purposes of the invention having been stated, others will appear as the description proceeds, when taken in connection with the accompanying drawings, in which:

FIG. 1 is a block diagram of a main personal computer (PC) in an embodiment of the present invention;

FIG. 2 is a block diagram of a hand-held terminal;

FIG. 3 shows how electric power is supplied to the components of the main PC in the suspend mode;

FIG. 4 shows how electric power is supplied to the embodiments of the main PC in the hibernation mode;

FIG. 5 shows an example of how the main PC when installed fixedly is used for data communications with the hand-held terminal;

FIG. 6 is a flowchart for installing an OS in the main PC;

FIG. 7 is a flowchart for starting up the OS in the normal mode;

FIG. 8 is a flowchart for starting up an application program in the normal mode;

FIG. 9 shows another example of how the main PC when installed fixedly is used for data communications with the hand-held terminal in the suspend or hibernation mode;

FIG. 10 shows still another example of how the main PC is used for data communications with the hand-held terminal in the suspend or hibernation mode;

FIG. 11 is a flowchart for a process executed in response to an access from the hand-held terminal;

FIG. 12 shows how electric power is supplied to the components of the main PC during transport when being accessed from the hand-held terminal;

FIG. 13 is a flowchart for a process executed in response to a request for starting up an application program from the hand-held terminal during transport; and FIG. 14 is a flowchart for a process executed in response to a request for reading data from the hand-held terminal during transport.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, FIG. 1 is a block diagram of a personal computer (a first computer apparatus) 10 in the embodiment of the present invention. FIG. 2 is a block diagram of a hand-held terminal (a second computer apparatus, external, external device) 30 in the embodiment of the present invention.

In this embodiment, a system (data server system) configured by the main personal computer 10 and the hand-held terminal 30 enables the user to access the main personal computer 10 from the hand-held terminal 30 so as to read/write data while the user brings it along with him/her (hereinafter, this state will be referred to as "moving").

As shown in FIG. 1, the main personal computer 10 is provided with a main memory 12 used as an internal storage device for enabling a CPU 1 to read/write data directly, as well as an HDD (the first data storage device, the movable memory, the first storage means) 13 and an MRAM (Magnetic Random Access Memory: the second data storage device, the solid-state memory, the second storage means) 14 used as external storage devices (the data storage device, the data storage means).

A DRAM (Dynamic Random Access Memory), which is a non-volatile memory or the like is used as the main memory 12. In this main memory 12, an internal memory controller 15 reads/writes data (internal data) according to instructions from the CPU and sends/receives data to/from the CPU 11.

The HDD 13 enables data (external data) to be written on disc-like magnetic disks (not shown), which are non-volatile recording media. In this HDD 13, each magnetic disk is driven rotationally by a spindle motor, so that an arm provided with a head at its tip is presented with the revolving magnetic media as required. The head reads/writes data from/to the corresponding magnetic disk. The HDD 13 has such mechanically movable parts.

On the other hand, the MRAM 14 is a non-volatile recording medium for holding data due to a magnetic field that has the TMR (Tunnel Magneto-Resistive) effect, thereby stopping supply of any voltage thereon. This MRAM 14 is a solid-state memory having no mechanically movable part.

The external memory controller (controller, data read/write means) 16 reads/writes data from/to those HDD 13 and the MRAM 14. The external memory controller 16 also sends/receives data to/from the main memory 12 via the internal memory controller 15.

The main PC 10 is provided with a display device 17 for displaying images and a display controller 18 for controlling the display on the display device 17. Furthermore, this main PC 10 is provided with a wireless communication device 20 used for external data communications, as well as, for example, a LAN driver 21 and a modem 22. The wireless communication device 20 enables data communications with the hand-held terminal 30, etc. via an antenna 23. The LAN driver 21 and the modem 22 are used for external data communications via a LAN cable 40, a telephone cable 41, as well as via an external LAN and a public telephone line. The I/O controller (request receiving means) 24 controls those external data communications via the wireless communication device 20, the LAN driver 21, and the modem 22.

Furthermore, the main PC 10 can use both DC battery 25 and AC source 26 as power sources. When both of the DC battery 25 and the AC power supply 26 are connected to the main PC 10, priority is given to the AC power supply 26. The voltage supplied from either the DC battery 25 or the AC power source 26 is supplied to the PC via the power supply controller 27. The power supply controller 27 switches between those power supplies to the PC 10 according to the mode selected from a plurality of modes shown below.

The operation modes of the main PC 10 are the normal mode (the first mode) in which an electric power is supplied to the entire main PC 10, the suspend mode (the third mode) shown in FIG. 3, and the hibernation mode (the third mode) shown in FIG. 4. In FIGS. 3 and 4, an electric power is supplied to each device denoted by a solid line and not to any device denoted by a dotted line.

In the suspend mode shown in FIG. 3, the power supply controller 27 supplies a voltage to the main memory 12, the internal memory controller 15, the wireless communication device 20, and the I/O controller 24 from the DC battery 25 or AC power source 26. In this mode, the data of both operating system (OS) and application program is copied from the MRAM 14 or HDD 13 in the normal mode and stored as is in the main memory 12.

This suspend mode is shifted from the normal mode (all the devices drawn by solid lines are powered) shown in FIG. 1 when no input time reaches a preset time while the housing 10A in which the display device 17 of the main PC 10 is installed is opened as shown in FIG. 5 or when the housing 10A is closed.

In the hibernation mode shown in FIG. 4, the power supply controller 27 enables the DC battery 25 or AC power source 26 to supply the voltage only to the wireless communication apparatus 20 and the I/O controller 24. In this mode, the power supply to the main memory 12 is shut off, so that the data of the OS and the application program copied into the main memory 12 from the MRAM 14 or HDD 13 in the normal mode is erased from the main memory 12.

This hibernation mode is shifted from the normal mode shown in FIG. 1 in response to, for example, a command input or a specific key input.

On the other hand, as shown in FIG. 2, the hand-held terminal 30 is provided with a main memory 31 composed by such non-volatile memory as a DRAM, or the like; a non-volatile memory 32 composed by a flash memory, or the like; a controller 33 for controlling the entire PC 10 according to the program stored in the memory 32; a display device 34 for displaying images; an input device 35 composed of an input pen, operation buttons, etc. used to enter data; and a wireless communication device 36 used for data communications with the PC 10 with use of an infrared beam and/or radio waves, etc.

This hand-held terminal 30 can send/receive data to/from the PC 10 not only when the main PC 10 is in the normal mode shown in FIG. 1, but also in the suspend mode shown in FIG. 3 and the hibernation mode shown in FIG. 4 and even while in mobile operation.

At this time, the data server system enables the hand-held terminal 30 to synchronize the data held in itself with the data held in the PC 10, as well as read/write data from/to the HDD 13 and the MRAM 14 of the PC 10. More concretely, the system does not enable the entire data shared by both of the PC 10 and the hand-held terminal 30 to be synchronized, but enables the hand-held terminal 30 to read only specific data, for example, the data from an address book, transfer only the newly edited data by itself to the main PC 10, and write the edited data in the data held in the main PC 10. In addition, when the hand-held terminal 30 starts up an application program used to browse e-mail, the system enables the hand-held terminal 30 to read e-mail data already received by the PC 10 so as to browse the e-mail data contained in itself through an "e-mail receiving" operation. Furthermore, the system enables the PC 10 to receive new e-mails from the mail server and transfer the e-mail data to the hand-held terminal 30 so that the hand-held terminal 30 can browse the e-mail.

As described above, when the main PC 10 is set in the suspend mode or the hibernation mode, or it is brought by the user in any of those modes, the main PC 10 can send/receive data to/from the hand-held terminal 30. Therefore, the operating system (OS) and various application programs are stored in the HDD 13 and the MRAM 14 separately in the main PC 10. In this embodiment, the basic components of the operating system (OS) including at least programs required for starting up the operating system, that is, a program referred to as an OS kernel are stored in the MRAM 14 having no mechanically movable part and being more durable than the HDD 13 against vibrations. In this embodiment, for example, such programs as a multimedia system extension module, etc. that are not used during moving are stored in the HDD 13. Of the various application programs installed in the PC 10, only the application programs to be used upon requests from the hand-held terminal 30 during mobile operation are stored in the MRAM 14 and other application programs are stored in the HDD 13.

Application programs to be used during mobile operation are of the type which include schedule management programs, e-mail programs, various sales promotion programs, etc. Application programs not to be used during mobile operation are word processor programs, spreadsheet programs, etc.

To obtain such a configuration of application programs, the BIOS (Basic Input/Output System) is used to execute the following processes when the operating system (OS) and application programs are installed.

Concretely, as shown in FIG. 6, when an operating system (OS) is to be installed, at first the detecting means detects whether or not the MRAM 14 is installed together with the HDD 13 in the PC 10 (that is, whether or not the PC 10 are connected to two types of external storage devices whose vibration properties are different from each other) (step S101). When the decision results is a YES (the MRAM 14 is connected), a panel window (panel) is displayed on the screen of the display device 17 (step S102). The panel is used as storage device specification requesting means that requests the user to specify the MRAM 14 or the HDD 13 in which at least the kernel of the OS is to be installed. When the decision result is NO (the MRAM 14 is not connected), all the OS programs are installed in the HDD 13 (step S105).

Receiving the user's specification in step S102, the detecting means decides whether or not the MRAM 14 is specified (step S103). When the decision result is a YES, the program storage means installs the OS kernel in the MRAM 14 and other programs in the HDD 13 (step S104). On the other hand, when the decision result is a NO, the program storage means installs all the OS programs in the HDD 13 (step S105).

When application programs are to be installed after the installation of the OS, the OS executes the processes as shown in the flowchart in FIG. 6. After the installation of the OS, the BIOS or OS already recognizes whether or not the MRAM 14 is installed in the main PC 10. Step S101 can thus be skipped. When the decision result is a NO, all the application programs are installed in the HDD 13 as usual.

When an application program is to be installed, a flag should be set in the setup program, in the application program itself, or in the parameter file so that the flag denotes the application program is to be used or not to be used during mobile operation. Consequently, the OS can output a message that recommends a storage device for the program or store the program in the MRAM 14 or HDD 13 automatically according to the flag.

The data to be held in the main PC 10 is stored in the MRAM 14 or HDD 13 according to whether or not it is used during mobile operation. At this time, it is also possible to select the MRAM 14 or HDD 13 automatically and write data in the selected one according to whether the application program in use is stored in the MRAM 14 or in HDD 13. It is also possible to enable the user to select the MRAM 14 or HDD 13 for storing data when the data is to be written therein. For the data stored in the MRAM 14 or HDD 13 in such a way, the destination storage information is held in a predetermined data storage area in the MRAM 14.

The main PC 10 in which the OS and application programs are installed in such a way executes the start-up processing as shown in the flowchart in FIG. 7 in the normal mode, that is, in the power-off state. In this embodiment, in the case where the MRAM 14 is not connected to the PC 10 when in the processing shown in FIG. 6 and the OS and all the application programs are installed in the HDD 13, the PC 10 operation will become the same as that of ordinary PCS. The description for the processing will thus be omitted here.

At first, the PC 10 is powered, then the CPU 11 receives the start-up command when the user executes a predetermined operation (ex., pressing the START button) (step S201). Thus, the external memory controller 16 reads the OS start-up program from the MRAM 14 (step S202) and copies the program into the main memory 12 via the internal memory controller 15 (step S203). The internal memory controller 15 then communicates the received start-up program to the CPU 11 and the CPU 11 starts up the OS according to the start-up program copied in the main memory 12 (step S204). At this time, the OS start-up program is read by an electric signal processing that requires no mechanical operation. Thus, the start-up program reading is completed faster than when the program is read from the HDD 13 that requires mechanical operations.

After this, the rest OS programs, for example, the multimedia system extension module, etc. are read from the HDD 13 and copied into the main memory 12, thereby the CPU 11 can start up each of those programs.

In the case where a specific application program is to be used only in the PC 10 after the OS is started up such way, the user is required to enter a predetermined command via the input means (not shown) of the PC 10.

Receiving the request command for starting up the specific application program as shown in FIG. 8 (step S301), the CPU 11 of the PC 10 refers to the target device information held in a predetermined data storage area of the MRAM 14 and decides whether or not the specified application program is stored in the MRAM 14 (step S302).

When the decision result is a YES, the external memory controller 16 reads the application program from the MRAM 14 (step S303). When the decision result is a NO (stored in the HDD 13), the external memory controller 16 reads the application program from the HDD 13 (step S304). The application program read from the MRAM 14 or HDD 13 is copied into the main memory 12 via the internal memory controller 15 (step S305). The CPU 11 thus starts up the application program copied into the main memory 12 (step S306). Afterwards, this application program executes a predetermined processing according to an input from the user.

In the case where the PC 10, started up in the normal mode as described above, uses an application program and data stored within itself according to a predetermined operation in the hand-held terminal 30 and/or stores data within itself, the PC 10 executes the following processing.

FIGS. 5, 9, and 10 show various patterns in which the PC 10 is used for data communications with the hand-held terminal 30.

FIG. 5 shows a state of the entire PC 10 started up in the normal mode. In this embodiment, it is assumed that the PC 10 in this state is connected to the LAN cable 40 and the telephone cable 41.

In FIG. 9, the housing 10A of the PC 10 is closed while the system is set in the suspend or hibernation mode. Also in this case, it is assumed that the PC 10 in this state is connected to the LAN cable 40 and the telephone cable 41.

FIG. 10 shows a state of the PC 10 set in the suspend or hibernation mode and housed in a bag 50 or the like. Concretely, the PC 10 is communicating with the hand-held terminal 30 during moving. In this state, the PC 10 is not connected to any of the LAN cable 40, the telephone cable 41, the AC power source 26 and the like, of course.

When the user enters predetermined data to the input device 35 so as to synchronize the data held in the hand-held terminal 30 with the data in the PC 10 or read/write data from/to the PC 10, the wireless communication device 36 of the hand-held terminal 30 sends a start-up command to the PC 10.

As shown in FIG. 11, the PC 10 receives this start-up command at the wireless communication device 20 via the antenna 23 (step S401). At this time, the wireless communication device 20 is kept powered in any of the normal mode, the suspend mode, the hibernation mode, and even during mobile operation.

Receiving the start-up command, the PC 10 recognizes its own status and checks the mode (suspend or hibernation) in which the PC 10 itself is set (step S402).

When the PC 10 is in neither the suspend nor the hibernation mode, that is, when the PC 10 is in the normal mode, the PC 10 starts up the subject application program, reads/writes data in response to the request from the hand-held terminal 30 in accordance with the normal mode processing flow shown in FIG. 8 (step S403). At this time, the application program that processes the request from the hand-held terminal 30 obtains the information related to the specified application program and the data-stored place from a predetermined data storage area via the external memory controller 16, then reads the specified application program and data from the MRAM 14 or HDD 13 according to the obtained data-stored place information.

On the other hand, when the decision result in step 402 is a YES (when the main PC 10 is set in the suspend or hibernation mode), the system goes to step S404.

Then, in steps S404 and 405, the system detects whether or not the main PC 10 is moving. At first, the detecting means (movement detecting means) detects whether or not the main PC 10 is connected to the AC power source 26 in step S404. When the main PC 10 is connected, the main PC 10 is not moving. The detecting means decides that the main PC 10 is installed on a desk or the like as shown in FIGS. 5 or 9. Thus, the detecting means communicates the decision result to the power supply controller 27. Receiving the result, the power supply controller 27 supplies an electric power to the entire PC 10 so as to set the main PC 10 in the normal mode (FIG. 1) (step S406). Then, according to the request from the hand-held terminal 30, the main PC 10 starts up the subject application program and reads/writes data in accordance with the normal mode processing flow shown in FIG. 8 (step S407).

When the connection of the AC power source 26 cannot be detected, the detecting means (movement detecting means) detects whether or not the LAN cable 40 and the telephone cable 41 are connected to the PC 10 in step S405. When the connection of at least either the LAN cable 40 or the telephone cable 41 is detected at this time, the detecting means decides that the PC 10 is not moving, but installed on a desk or the like as shown in FIGS. 5 or 9. The detecting means thus communicates the decision result to the power supply controller 27.

Receiving the result, the power supply controller 27 goes to step S406 so as to power the whole PC 10. Then, the power supply controller 27 executes processes requested in the normal mode in accordance with the processing flow as shown in FIG. 8 (step S407).

When the detecting means fails in detection of the connection to any of the LAN cable 40 and the telephone cable 41 in steps 404 and 405, the detecting means goes to step S408 so as to communicate the acceptance of the start-up command to the power supply controller 27.

Receiving the notice, the power supply controller 27 supplies an electric power to the CPU 11, the external memory controller 16, and the MRAM 14 respectively When the PC 10 is in the suspend mode at that time. When the PC 10 is in the hibernation mode, the power supply controller 27 supplies an electric power to the CPU 11, the internal memory controller 15, the main memory 12, the external memory controller 16, and the MRAM 14, thereby the main PC 10 is set in a state as shown in FIG. 12 (hereinafter, such a state is referred to as "the moving mode" (a decided mode, the second mode)) (step S409).

Then, the OS kernel is started up while the PC 10 is powered in the moving mode. In this case, when the PC 10 is in the suspend mode, the OS start-up program is read from the main memory 12 into the CPU 11 so as to start up the OS. When the PC 10 is in the hibernation mode, the OS start-up program is read from the MRAM 14, then copied into the main memory 12. The CPU 11 then starts up the OS with use of the start-up program copied in the main memory 12 (step S410).

After the OS (kernel) is started up successfully as described above, the main PC 10 reads an application program used for the processing requested from the hand-held terminal 30. The read application program is copied into the main memory 12, then the CPU 11 starts up the application program copied into the main memory 12 (step S411).

Started up in the moving mode shown in FIG. 11, the application program executes a processing requested from the hand-held terminal 30.

For example, when starting up of an application program is requested from the hand-held terminal 30, the system identifies the type of the requested application program, then decides whether or not the program is stored in the MRAM 14 (step S501).

When the decision result is YES, the system reads the requested application program from the MRAM 14 (step S502), then copies the program into the main memory 12 (step S503). After this, the system starts up the application program copied into the main memory 12 in the CPU 11 (step S504). Then, the system executes a requested processing with use of the application program (step S505) and sends the processing result to the hand-held terminal 30 via the wireless communication device 20. Receiving the data from the PC 10 at the wireless communication device 36, the hand-held terminal 30 displays the data on the screen of the display device 34.

On the other hand, when the decision result is NO (not stored in the MRAM 14, but stored in the HDD 13), the application program sends an error message such as "the requested application program cannot be accessed during moving" via the wireless communication device 20 (step S506). The hand-held terminal 30 then receives the message via the wireless communication device 36 and displays it on the screen of the display device 34.

When the hand-held terminal 30 requests reading of data, the application program used to process the request from the hand-held terminal 30 identifies the device in which the requested data is stored and decides whether or not it is stored in the MRAM 14 (step S601).

When the data is stored in the MRAM 14, the application program reads the requested data from the MRAM 14 (step S602), then copies it into the main memory (step S603). After this, the application program sends data to the hand-held terminal 30 via the wireless communication apparatus 20 (step S604). Receiving the data via the wireless communication device 36, the hand-held terminal 30 displays the data or the result of the processing according to the data, etc. on the screen of the display device 34.

On the other hand, when the requested data is not stored in the MRAM 14, that is, when it is stored in the HDD 13, the application program sends an error message such as "the requested data cannot be accessed during moving" to the hand-held terminal 30 via the wireless communication apparatus 20 (step S605). Receiving the error message via the wireless communication device 36, the hand-held terminal 30 displays it on the screen of the display device 34.

When the hand-held terminal 30 requests writing of data in the PC 10, the application program used to process the request identifies whether the device in which the requested data is to be written is the MRAM 14 or the HDD 13. When the device is the MRAM 14, the application program writes the requested data in the MRAM 14. When the device is the HDD 13, the application program sends an error message such as "the requested data cannot be written during moving" to the hand-held terminal 30.

According to the configuration as described above, when the user executes a predetermined operation for the hand-held terminal 30 while the user brings the PC 10 set in the suspend or hibernation mode with him/her, data is read/written only from/to the MRAM 14 that is more durable than the HDD 13 against vibrations. Consequently, the PC 10 can be prevented effectively from read/write errors, data crash, etc. to arise from the HDD 13 being driven during moving, as well as the breakdown of the HDD 13 itself, thereby the reliability of the PC 10 can be more improved.

Furthermore, the power supply controller 27 of the PC 10 can stop power supply to the HDD 13 having mechanically movable parts while supplying an electric power to the MRAM 14 when a processing is requested from the hand-held terminal 30 during moving as described above. The power consumption of the system can thus be suppressed.

Furthermore, in the case where the main PC 10 can detect whether or not it is connected to, for example, the AC power source 26, the LAN cable 40, and the telephone cable 41, thereby it can decide automatically whether or not it is moving. Consequently, the configuration of the PC 10 in the above embodiment can be realized without providing itself with any new devices such as an acceleration sensor, etc. used to detect vibrations.

Furthermore, in the above embodiment, the OS kernel is stored in the MRAM 14 that includes no mechanically movable part, so that no mechanical operation is required for starting up the OS. When compared with a case where the OS is read from the HDD 13, therefore, the time required for process between start-up of the OS and reading of data becomes shorter and the OS can be started up faster.

While the OS kernel is stored in the MRAM 14 and other OS programs are stored in the HDD 13 in the above embodiment, the present invention is not limited only to such the embodiment; the OS can be stored in any device appropriately to the capacity of the MRAM 14, as well as the set values of the components used during moving. This is also the same for the devices used to store application programs and data. When the MRAM 14 can have a capacity enough, all the OS programs may be stored in the MRAM 14. Otherwise, those OS programs can be dispersed in the HDD 13 and the MRAM 14 separately.

Furthermore, the system is provided with two types of external memories (MRAM 14 and HDD 13) that are different from each other in anti-vibration properties, presence of mechanically movable parts, and a time required between start-up of the OS and reading of data in the above embodiment, other types of storage apparatuses may be employed. The external storage apparatuses of the PC 10 may not be limited to only two; three or more types may be used. In such a case, it is just required to use a storage device strongest against vibrations or having no mechanically movable part, or having the shortest time required for a process between start-up of the OS and reading of data.

While it is detected whether or not the PC 10 is connected to the AC power source 26, the LAN cable 40, and the telephone cable 41 so as to decide whether or not the PC 10 is moving in the above embodiment, another item can be used for detecting such a movement. The PC 10 can also be provided with such a vibration detecting device as an acceleration sensor, etc. so as to detect such a movement. In this case, however, the manufacturing cost of the PC 10 will rise.

It is also possible to start up the OS only in the moving mode while the PC 10 is in the suspend or hibernation mode without detecting whether or not the PC 10 is moving, so that data is read/written only from/to the MRAM 14 while whether or not the main PC 10 is moving is detected in the above embodiment. In this case, the main PC 10 may be configured so that the PC 10 sends a message such as an HDD access confirmation to the hand-held terminal 30 when an access to the HDD 13 is requested. The main PC 10 drives the HDD 13 when receiving a reply to the confirmation message from the user and the main PC 10 does not drive the HDD 13 when receiving no reply.

Furthermore, while power supply to the MRAM 14, the HDD 13, etc. is controlled by the power supply controller 27 in the above embodiment, it is also possible to configure the main PC 10 so that the HDD 13 is not driven while the power supply to the HDD 13 is kept so as to avoid adverse influence on the driving of the HDD 13 during moving.

While a so-called portable information processing terminal is employed as the lap-top PC used as the PC 10 and the hand-held terminal 30 in the above embodiment, it may be replaced with another one. For example, the hand-held terminal 30 may be connected to a portable telephone or the like instead of the wireless communication device 36, thereby making data communications with the PC 10 via the portable telephone. And, the portable telephone itself may be used as the hand-held terminal 30 instead of the portable information terminal.

Furthermore, while the user moves with both of the PC 10 and the hand-held terminal 30 with him/her in the above embodiment, the present invention is not limited only to the method; the PC 10 and the hand-held terminal 30 may be used at different places. The relationship between the PC 10 and the hand-held terminal 30 may be assumed as a relationship between a server and a client terminal. In those embodiments, for example, it is possible to use the main PC 10 as a server during moving and employ a fixed terminal as a client terminal instead of the portable hand-held terminal 30.

Furthermore, the power consumption of the main PC 10 can be constrained by controlling the power supply of the main PC 10 just like in the above embodiment. Concretely, the power supply controller 27 keeps the power supply to the MRAM 14 and stops the power supply to the HDD 13 having mechanically movable parts even while the user uses the PC 10 as a single unit in a train or aircraft.

As is well-known in the art, controllers 15, 16, 18, 24, and 27 may be implemented as separate LSI parts, or as a single VLSI part containing all of the functions described hereinabove with respect to these controllers.

As described above, according to the present invention, it is possible to execute a requested process surely even during mobile use when being externally accessed without causing any errors, data crash, breakdown, etc. in the computer apparatus.

In the drawings and specifications there has been set forth a preferred embodiment of the invention and, although specific terms are used, the description thus given uses terminology in a generic and descriptive sense only and not for purposes of limitation.

We claim as our invention:

1. A computing apparatus, comprising:
a first data storage device;
a durable data storage device capable of withstanding higher levels of vibration than said first data storage device; and
a controller which controls access to said durable data storage device and which controls the flow of electrical power to said first and said durable data storage devices;
wherein said controller selects alternative operating modes including a first mode which supplies electrical power to said first and said durable data storage devices, and a second mode which supplies electrical power to said durable data storage device while suppressing electrical power to said first data storage device.

2. Apparatus according to claim 1, wherein said alternative operating modes further include a third mode in which said controller supplies no electrical power to said first and said durable data storage devices.

3. Apparatus according to claim 2, wherein said controller selects said second mode of operation when a predetermined condition is satisfied while operating in said third mode.

4. Apparatus according to claim 1, wherein
said durable storage device stores at least a start-up portion of an operating system, and
said start-up portion of said operating system is executed from said durable data storage device so as to start up said operating system upon receiving an external access request while operating in a predetermined mode which is one of a suspend mode or a hibernation mode.

5. Apparatus according to claim 1, wherein
said first data storage device is a movable memory having a mechanically movable part, and
said durable data storage device is a solid-state memory having no mechanically movable part.

6. Apparatus according to claim 5, wherein said solid-state memory is a magnetic random access memory.

7. Apparatus according to claim 1, wherein said controller further comprises:
a motion detector which detects when the apparatus is in a state of motion and generates a motion signal;
wherein said controller selects at least one of the alternative operating modes as a function of the motion signal.

8. Apparatus according to claim 1, further comprising:
a communication module which communicates with and receives external access requests from an external device, and which generates an external access request signal in response to any external access request;
wherein said controller accesses said durable data storage device in response to the external access request signal.

9. Apparatus according to claim 8, wherein said durable data storage device stores at least a kernel of said operating system and an application program for processing on the external device.

10. A computer apparatus, comprising:
a first data storage device;
a second data storage device; and
a processor which accesses and executes programs stored in said first and said second storage devices, including a start-up program for self initialization from a low power operation mode, and which accepts external access requests provided by external devices;
wherein said first and said second data storage devices are used as storage for storing data, said second data storage device requiring a time shorter than said first data storage device for executing the start-up program, and
wherein said processor, when starting up, reads said start-up program from said second data storage device, said processor, when accepting an external access request while in said low power operation mode, executes said start-up program from said second data storage device so as to self start and thereafter executes the external access request.

11. Apparatus according to claim 10, further comprising:
a power supply controller, coupled to said processor and to said second data storage device, which controls the flow of electrical power to said second data storage device under the control of said processor;
wherein said processor, when executing the external access request while in said low-power operation mode and while said second data storage device is powered off, instructs said power supply controller to supply electric power to said second data storage device.

12. A computer apparatus, comprising:
a first and a second data storage device;
a request receiver which receives an external request provided by an external device; and a power supply controller, coupled to said request receiver, which controls the supply of power to said first and said second data storage devices;

wherein said request receiver communicates a data read/write request to said power supply controller in response to the external request while said first and second data storage devices are powered off, and said power supply controller maintains said first data storage device in a powered off state and changes the power state of said second data storage device to the powered on state in response to the data read/write request.

13. Apparatus according to claim 12, wherein said second data storage device is capable of withstanding higher levels of vibration than said first data storage device.

14. Apparatus according to claim 12, wherein
said second data storage device stores at least a start-up program of an operating system, and
said request receiver, in response to the external request and while the operating system requires start-up, reads said start-up program from said second data storage device so as to start up the operating system.

* * * * *